(No Model.)
W. T. CARROLL.
SPINDLE AND BEARING THEREFOR.
No. 256,122. Patented Apr. 11, 1882.
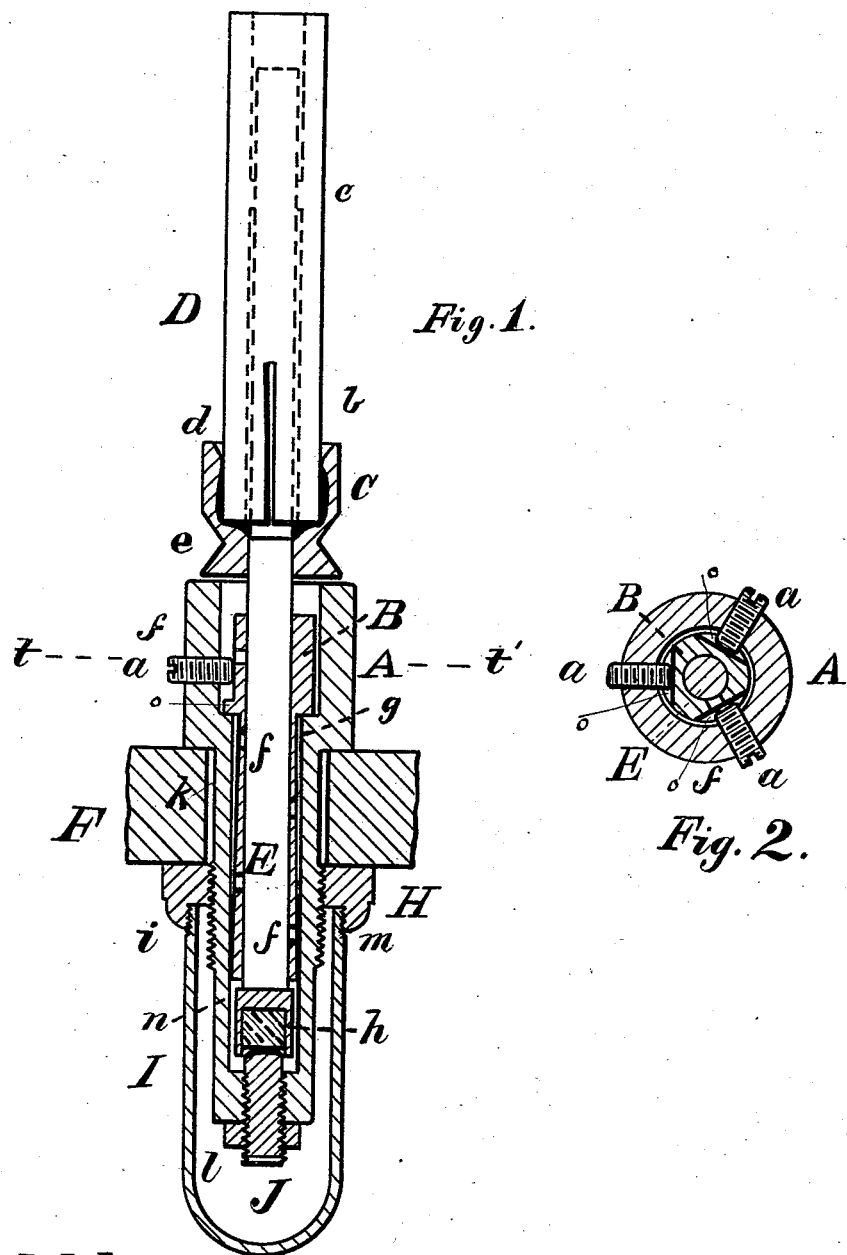
Witnesses:
Edward F. Tolman
E. K. Hill
Inventor.
W. T. Carroll.
BY HIS ATTY. J. G. Arnold

UNITED STATES PATENT OFFICE.

WILLIAM T. CARROLL, OF WORCESTER, MASSACHUSETTS, ASSIGNOR, BY DIRECT AND MESNE ASSIGNMENTS, TO HENRY W. MASON, OF SAME PLACE, AND WILLIAM F. DRAPER, OF HOPEDALE, MASSACHUSETTS.

SPINDLE AND BEARING THEREFOR.

SPECIFICATION forming part of Letters Patent No. 256,122, dated April 11, 1882.

Application filed May 7, 1881. (No model.)

*To all whom it may concern:*

Be it known that I, WILLIAM T. CARROLL, of Worcester, Massachusetts, have invented new and useful Improvements in Spindles and in Bearings therefor, of which the following is a specification.

My invention relates to that class of spindles and bearings which are used on spinning-machines employing a single rail, though said improvements are partly applicable to those in which a greater number of rails are made use of. Its nature is set forth in the following description and shown in the accompanying drawings, of which—

Figure 1 is a side view, partly in section, of a spindle and its accessories embodying my invention; and Fig. 2 is a cross-section of the same, taken on the line $t\,t'$ of Fig. 1.

A is the supporter passing through the supporting-rail, in which it is held by its nut H. The hole in the rail, being a little larger than the neck $k$ of the supporter, allows it to be set to the center of the ring which works above it. Within the supporter A is an adjustable bolster, B, in which the spindle E runs, its lower end fitting the hole in the supporter A and its upper part tapered, as shown, allowing the top $g$ to be adjusted by the screws $a\,a\,a$ or similar means, and the spindle E thereby plumbed. The screws $a\,a\,a$ bear on the three flat faces of the head of the adjustable bolster B above their shoulders $o\,o\,o$. The spindle E is made with a shoulder, $n$, below the bolster B, and its lower end made hollow to receive the washer $h$, of rawhide or other suitable material, which rests on the smooth end of the screw J, by which the height of the spindle is adjusted, the nut $l$ on the outside of supporter A retaining said screw when set; or with a spindle of proper material it is evident the washer may be left out and the end of the spindle only slightly hollowed. Below these is the drip-cup I, with its sides extending up and attached to the nut H, as shown; or it may be supported by screws to the under side of the rail.

The whirl C, by which the spindle is driven, I make with a hollow top and a bead or ridge, $d$, at or near its edge, into which the split end of the bobbin D can be pressed and held. By these means the spindle can be plumbed and centered in its ring, and in operation is held, when the bobbin is removed, by the shoulder $n$ on the spindle abutting against the lower end of bolster B. The shoulders $o\,o\,o$ upon the head of the bolster B, engaging with the screws $a\,a\,a$, also prevent the removal of the bolster when the bobbin is removed from the spindle, while at the same time the said screws, bearing upon the flat sides of the bolster, prevent the latter from turning. The cup I catches all the overflow or drip.

Having thus fully described my invention, what I claim therein as new, and desire to secure by Letters Patent, is—

1. The spindle having a shoulder, $n$, and hollow end, in combination with a bolster having a bearing for the shoulder $n$, and an adjustable screw, J, on which the hollow end of the spindle rests, as above described.

2. The combination of the supporter A with the tapering bolster B, whose lower end fits the interior of the supporter A, and whose upper end is capable of adjustment therein, and the screws $a\,a\,a$, in the manner and for the purposes substantially as set forth.

3. The spindle having a shoulder, $n$, and the bolster B, having shoulders $o\,o\,o$, in combination with the screws $a\,a\,a$ and the supporter A, substantially as above described.

WILLIAM T. CARROLL.

Witnesses:
JAS. GREENE,
J. G. ARNOLD.